US009251739B2

(12) United States Patent
Tsai et al.

(10) Patent No.: US 9,251,739 B2
(45) Date of Patent: Feb. 2, 2016

(54) STEREOSCOPIC DISPLAY DEVICE AND METHOD FOR DRIVING A STEREOSCOPIC DISPLAY THAT UPDATES A PLURALITY OF DISPLAY ZONES

(71) Applicant: AU OPTRONICS CORP., Hsin-Chu (TW)

(72) Inventors: Meng-Chieh Tsai, Hsin-Chu (TW); Chih-Wen Chen, Hsinchu (TW); Chih-Hung Shih, Hsin-Chu (TW); Chih-Jen Hu, Hsinchu (TW); Ren-Wei Liao, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/504,604

(22) Filed: Oct. 2, 2014

(65) Prior Publication Data

US 2015/0015622 A1 Jan. 15, 2015

Related U.S. Application Data

(63) Continuation of application No. 12/884,170, filed on Sep. 16, 2010, now Pat. No. 8,885,028.

(30) Foreign Application Priority Data

Dec. 23, 2009 (TW) ............................ 098144605 A

(51) Int. Cl.

| | |
|---|---|
| ***H04N 13/00*** | (2006.01) |
| ***G09G 3/34*** | (2006.01) |
| ***G02B 27/22*** | (2006.01) |
| ***G02B 27/26*** | (2006.01) |

(Continued)

(52) U.S. Cl.
CPC ............ *G09G 3/3406* (2013.01); *G02B 27/225* (2013.01); *G02B 27/2264* (2013.01); *G02B 27/26* (2013.01); *G09G 3/003* (2013.01); *H04N13/0409* (2013.01); *H04N 13/0413* (2013.01); *H04N 13/0497* (2013.01); *G09G 2300/023* (2013.01)

(58) Field of Classification Search
CPC ................ G09G 3/3406; G09G 3/003; G09G 2300/023; H04N 13/0409; H04N 13/0413; H04N 13/0497; G02B 27/225; G02B 27/2264; G02B 27/26
USPC .................. 348/42, 51; 345/690, 102, 8, 629; 359/465
See application file for complete search history.

(56) References Cited

U.S. PATENT DOCUMENTS

| | | | |
|---|---|---|---|
| 2,301,254 | A | 11/1942 | Carnahan |
| 5,315,377 | A | 5/1994 | Isono et al. |

(Continued)

FOREIGN PATENT DOCUMENTS

| | | |
|---|---|---|
| TW | 200723197 | 6/2007 |
| TW | 200832008 | 8/2008 |

*Primary Examiner* — Y Lee
*Assistant Examiner* — Richard Carter
(74) *Attorney, Agent, or Firm* — WPAT, PC; Justin King; Douglas A. Hosack

(57) ABSTRACT

A first display zone and a second display zone are displayed based on a first light source group, which corresponds to a first voltage data signal; and then the second display zone and a third display zone are displayed based on light for a second light source group, which corresponding to a second voltage data signal. The first light source group and the second light source group illuminate the display zones alternatively. Each display zone is fed with either a first data voltage signal or a second data voltage signal. While the first data voltage signal is updating each display zone in sequence, the second data voltage signal starts updating the first display zone when the first voltage signal is updating the third display zone.

20 Claims, 7 Drawing Sheets

(51) Int. Cl.
*G09G 3/00* (2006.01)
*H04N 13/04* (2006.01)

(56) References Cited

U.S. PATENT DOCUMENTS

| | | | | |
|---|---|---|---|---|
| 7,492,514 | B2 * | 2/2009 | Hamagishi et al. | 359/465 |
| 7,616,172 | B2 * | 11/2009 | Lin et al. | 345/8 |
| 7,710,648 | B2 | 5/2010 | Chestak et al. | |
| 7,817,166 | B2 * | 10/2010 | Paquette | 345/629 |
| 2006/0072006 | A1 | 4/2006 | Lin et al. | |
| 2006/0238545 | A1 | 10/2006 | Bakin et al. | |
| 2007/0103424 | A1 | 5/2007 | Huang | |
| 2007/0229654 | A1 * | 10/2007 | Kusuno | 348/51 |

* cited by examiner

STEREOSCOPIC DISPLAY DEVICE AND METHOD FOR DRIVING A STEREOSCOPIC DISPLAY THAT UPDATES A PLURALITY OF DISPLAY ZONES

CROSS REFERENCE TO RELATED APPLICATIONS

This application is a continuation application of, and claims priority benefit of, application Ser. No. 12/884,170 filed on Sep. 16, 2010, which is based upon and claims the benefit of priority from the prior Taiwan Patent Application No. 098144605 filed on Dec. 23, 2009. The entirety of each of the above-mentioned patent applications is hereby fully incorporated herein by reference and made a part of this specification.

BACKGROUND OF THE INVENTION

1. Field of the Invention

The present invention relates to a stereoscopic display, and more particularly, to a time-sequential stereoscopic display.

2. Description of Prior Art

Human beings see real-world images using both eyes. Further, the human brain forms three-dimensional (3D) images according to differences in spatial distance between two views seen by both eyes from two different angles. A 3D display is designed to create simulations of human visual fields from different angles to help users perceive 3D images when viewing two-dimensional (2D) images.

Currently, 3D displays are divided into two categories. One is auto-stereoscopic displays; the other is stereoscopic displays. Users of auto-stereoscopic displays are able to view 3D images without wearing glasses with a unique structure while ones of stereoscopic displays have to wear specially designed glasses to view 3D images.

The principle of a 3D display of parallax barrier patterns inside auto-stereoscopic displays is that, based on an opaque parallax barrier, users of auto-stereoscopic displays are able to view parallax images with both eyes, and such a parallax produces the third dimension in the brain. The principle of a spatial sequential 3D display is that a time-irrelevant parallax barrier is employed to let both eyes see two different groups of pixels, and the two groups of pixels are provided with signals from the left and right eyes, respectively, so both eyes can view different images. But, the drawback is that the resolution declines to one-half of the original resolution. The principle of a time sequential 3D display is that a time-manipulating and synchronously-driven-with-display-panel parallax barrier is employed to let both eyes see the same group of pixels at different time points. This group of pixels is supplied with signals of left and right eyes at different time points, respectively, to let each eye view different images. However, considering that a single human eye must receive signals of 60 Hz to avoid perceiving flicker, a time sequential 3D display usually requires a frame rate of at least 120 Hz.

Referring to FIG. 1 showing a schematic diagram of a time sequential 3D display device 10, the display device 10 comprises a liquid crystal panel 12 and a barrier 14. The liquid crystal panel 12 comprises a pixel matrix. The barrier 14 has multiple stripe openings 14 (*a*) thereon. With the use of the above-mentioned barrier 14, left-eye and right-eye images are separated, and then the separated images are reflected into a viewer's left eye L and right eye R, respectively. At frame N, pixels of odd columns are displayed based on left-eye signals, while pixels of even columns are displayed based on right-eye signals, and the barrier 14 is deemed to operate in "LR mode".

While at frame N+1, pixels of odd columns are displayed based on right-eye signals, while pixels of even columns are displayed based on left-eye signals, and the barrier 14 is deemed to operate in "RL mode". Because the liquid crystal panel 12 adopts a row-by-row scanning, column numbers distributed by left- and right-eye signals on the upper part of the liquid crystal panel 12 are different from those distributed on the lower part when the frame of the liquid crystal panel 12 is updated medially. Take FIG. 1 for example, signals received by pixels on the upper part of the liquid crystal panel 12 are in RL mode while signals received by pixels on the lower part are in LR mode. However, if the barrier 14 as a disparity barrier is in motion at the same time, the human eye will receive mixed left- and right-eye signals in the end.

There are two approaches to avoid the above-mentioned problem: one is black frame insertion (BFI) and the other is dynamically switching the backlight module. The BFI approach proceeds as follows: After a frame where images are displayed according to odd columns with right-eye signals and even columns with left-eye signals is shown, insert a black frame and then another frame where images are displayed according to odd columns with left-eye signals and even columns with right-eye signals. Repetitively, insert a black frame and then another frame where images are displayed according to odd columns with right-eye signals and even columns with left-eye signals. As for dynamically switching the backlight module, the method is as follows: when a liquid crystal panel is scanning, the backlight module is turned off. Then the frame will hold its state for a while after finished being scanned, the backlight module will be turned on at this time. Then the liquid crystal panel will continue scanning the next frame, and the backlight module is turned off again. Unfortunately, the two approaches share a common problem; that is, a refresh rate higher than 120 Hz is required (e.g., 240 Hz is needed for the BFI method) in order to permit the human eye receive frames at 60 Hz. This will produce additional power consumption and increase design complexity.

BRIEF SUMMARY OF THE INVENTION

It is therefore an object of the present invention to provide a three-dimensional display device where a liquid crystal panel includes at least three display zones and two light sources. Each display zone displays images in different time sequences according to different light sources in order to solve the problem described above.

According to the present invention, a stereoscopic display for showing a 3D image, comprises: a first light source group for generating first light in response to a first enabling signal; a second light source group for generating second light in response to a second enabling signal; a display unit comprising a first display zone, a second display zone, and a third display zone, each display zone for showing an image in response to a first data voltage signal or a second data voltage signal, based on the first light or the second light; and a barrier comprising a first shielding unit and a second shielding unit, the first shielding unit enabling in response to a first shielding signal and the second shielding unit enabling in response to a second shielding signal. The first and second display zones show the image based on the first light when all the following conditions occur: the first display zone and the second display zone receiving the first data voltage signal, the third display zone receiving the second data voltage signal, the first shielding unit enabling in response to the first shielding signal, and the first light source group turning on in response to the first enabling signal to generate the first light. The second and third display zones show the image based on the second light when all the following conditions occur: the first display zone receiving the second data voltage signal, the second display zone and the third display zone receiving the first data voltage signal, the first shielding unit enabling in response to the first shielding signal, and the second light source group turning on in response to the second enabling signal to generate the second light. The first and second display zones show the image based on the first light when all the following conditions occur: the first display zone and the second display zone receiving the second data voltage signal, the third display zone receiving the first data voltage signal, the second shielding unit enabling in response to the second shielding signal, and the first light source group turning on in response to the first enabling signal to generate the first light. The second and third display zones show the image based on the second light when all the following conditions occur: the first display zone receiving the first data voltage signal, the second display zone and the third display zone receiving the second data voltage signal, the second shielding unit enabling in response to the second shielding signal, and the second light source group turning on in response to the second enabling signal to generate the second light.

In one aspect of the present invention, a frequency of the first shielding signal or the second shielding signal or the first enabling signal or the second enabling signal equals one-half of a scan frequency of the stereoscopic display.

According to the present invention, a method of driving a display to show a 3D image, the display comprising a display unit and a barrier, is provided. The display unit comprises a first display zone and a second display zone. The barrier comprises a first shielding unit and a second shielding unit. The method comprises the steps of: providing a first light source group for generating first light and a second light source group for generating second light; the first display zone shows the image based on the first light when all the following conditions occur: the first display zone receiving the first data voltage signal, the second display zone receiving the second data voltage signal, the first shielding unit enabling in response to a first shielding signal, and the first light source group turning on to generate the first light; the second display zone shows the image based on the second light when all the following conditions occur: the first display zone receiving the second data voltage signal, the second display zone receiving the first data voltage signal, the first shielding unit enabling in response to the first shielding signal, and the second light source group turning on to generate the second light; the first display zone shows the image based on the first light when all the following conditions occur: the first display zone receiving the second data voltage signal, the second display zone receiving the first data voltage signal, the second shielding unit enabling in response to a second shielding signal, and the first light source group turning on to generate the first light; and the second and third display zones show the image based on the second light when all the following conditions occur: the first display zone receiving the first data voltage signal, the second display zone receiving the second data voltage signal, the second shielding unit enabling in response to the second shielding signal, and the second light source group turning on in response to the second enabling signal to generate the second light.

These and other objects of the claimed invention will become apparent to those of ordinary skill in the art after reading the following detailed description of the preferred embodiment that is illustrated in the various figures and drawings.

DETAILED DESCRIPTION OF THE INVENTION

Figure 1:
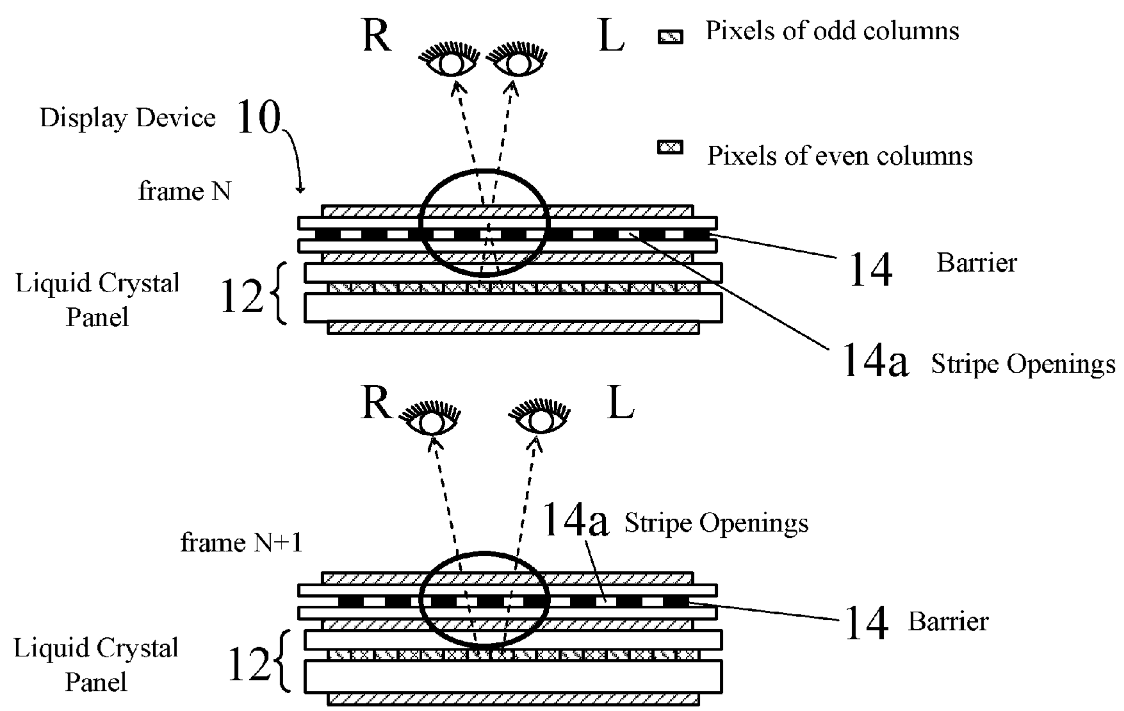
FIG. 1 shows a schematic diagram of a time sequential 3D display device.
Figure 2:
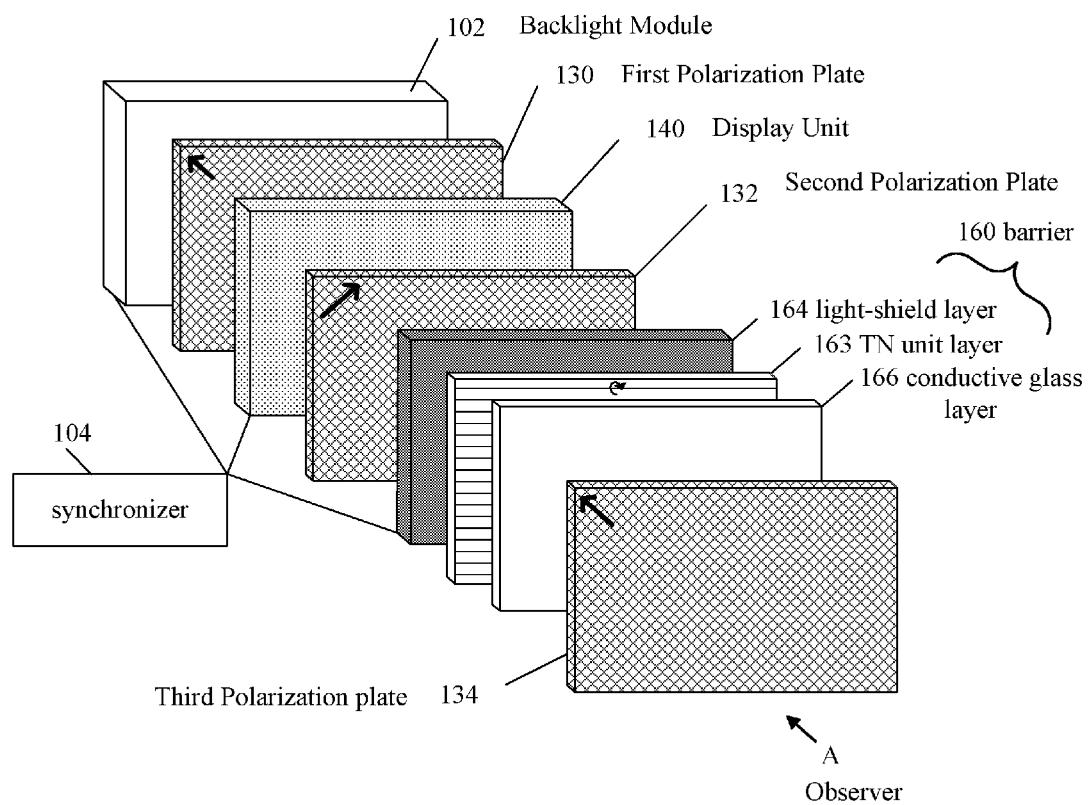
FIG. 2 shows a schematic diagram of a stereoscopic display according to the present invention.

Referring to FIG. 2 showing a schematic diagram of a stereoscopic display 100 of the present invention which displays 3D images, users can view 3D stereoscopic images by using the three-dimensional stereoscopic display 100. The stereoscopic display 100 comprises a backlight module 102, a synchronizer 104, a first polarization plate 130, a display unit 140, a second polarization plate 132, a barrier 160, and a third polarization plate 134. The backlight module 102 comprises a light emitting diode (LED) or a cold cathode fluorescent lamp (CCFL). The display unit 140 can be an LCD panel, which comprises pixel matrixes consisting of a plurality of pixels. The backlight module 102 produces light, which is irradiated to the first polarization plate 130. The first polarization plate 130 is set at about 135 degrees to the polarization axis based upon a view of an observer A, so it allows light with a polarization axis of 135 degrees to be transmitted. The second polarization plate 132 is set at about 45 degrees to the polarization axis based upon observer A, so it allows light with a polarization axis of 45 degrees to be transmitted. The third polarization plate 134 is disposed on the light-emitting side of the barrier 160. The third polarization plate 134 is set at about 135 degrees to the polarization axis based upon the observer A, so it allows light with a polarization axis of 135 degrees to be transmitted.

Figure 3:
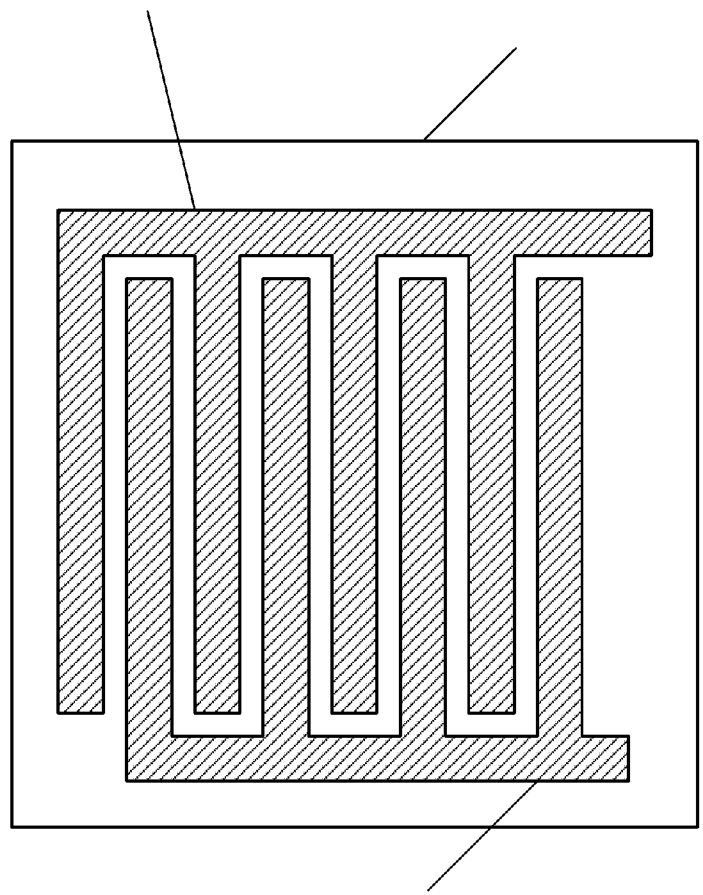
FIG. 3 shows a structure diagram of the barrier in FIG. 2.

Referring to FIG. 3 showing a structure diagram of the barrier 160 in FIG. 2, the barrier 160 comprises a light-shield layer 164, a conductive glass layer 166, and a twisted nematic (TN) layer 163 therebetween. The light-shield layer 164 forms a first shielding unit 161 and a second shielding unit 162, both of which are stripe-shaped. The stripe-shaped first shielding unit 161 and second shielding unit 162 substantially correspond to odd and even columns, respectively. The conductive glass layer 166 is an indium tin oxide (ITO) conductive layer, which is coupled to a common voltage Vcom; the first shielding unit 161 and second shielding unit 162 can be enabled/disabled depending on the first or second shielding signals from the synchronizer 104. For instance, when the first shielding unit 161 receives the first shielding signals whose voltage level V higher than the common voltage Vcom, TN liquid crystal molecules within TN unit layer 163, corresponding to a relative position of the first shielding unit 161, rotate according to the voltage difference between voltage level V applied on the first shielding unit 161 and the common voltage Vcom applied on the conductive glass layer 166. At this time, the first shielding unit 161 is in an "on" state, allowing the light from the second polarization plate 132 transmit. Meanwhile, the voltage applied on the second shielding unit 162 equals the common voltage Vcom applied on the conductive glass layer 166, therefore the second shielding unit 162 is in an "off" state that blocks light. Conversely, when the first shielding unit 161 receives a signal whose voltage level equals the common voltage Vcom, and the second shielding unit 162 receives a signal whose voltage level V is higher than the common voltage Vcom, the first shielding unit 161 is disabled so that light cannot transmit while the second shielding unit 162 is enabled to let light transmit. Based on the above-mentioned principle, light can be controlled to transmit through the first shielding unit 161 or the second shielding unit 162 according to the first or second shielding signals generated from the synchronizer 104. In this way, that the barrier 160 controls whether images of pixels in odd or even columns in the display unit 140 are viewed by the human eye.

Figure 4:
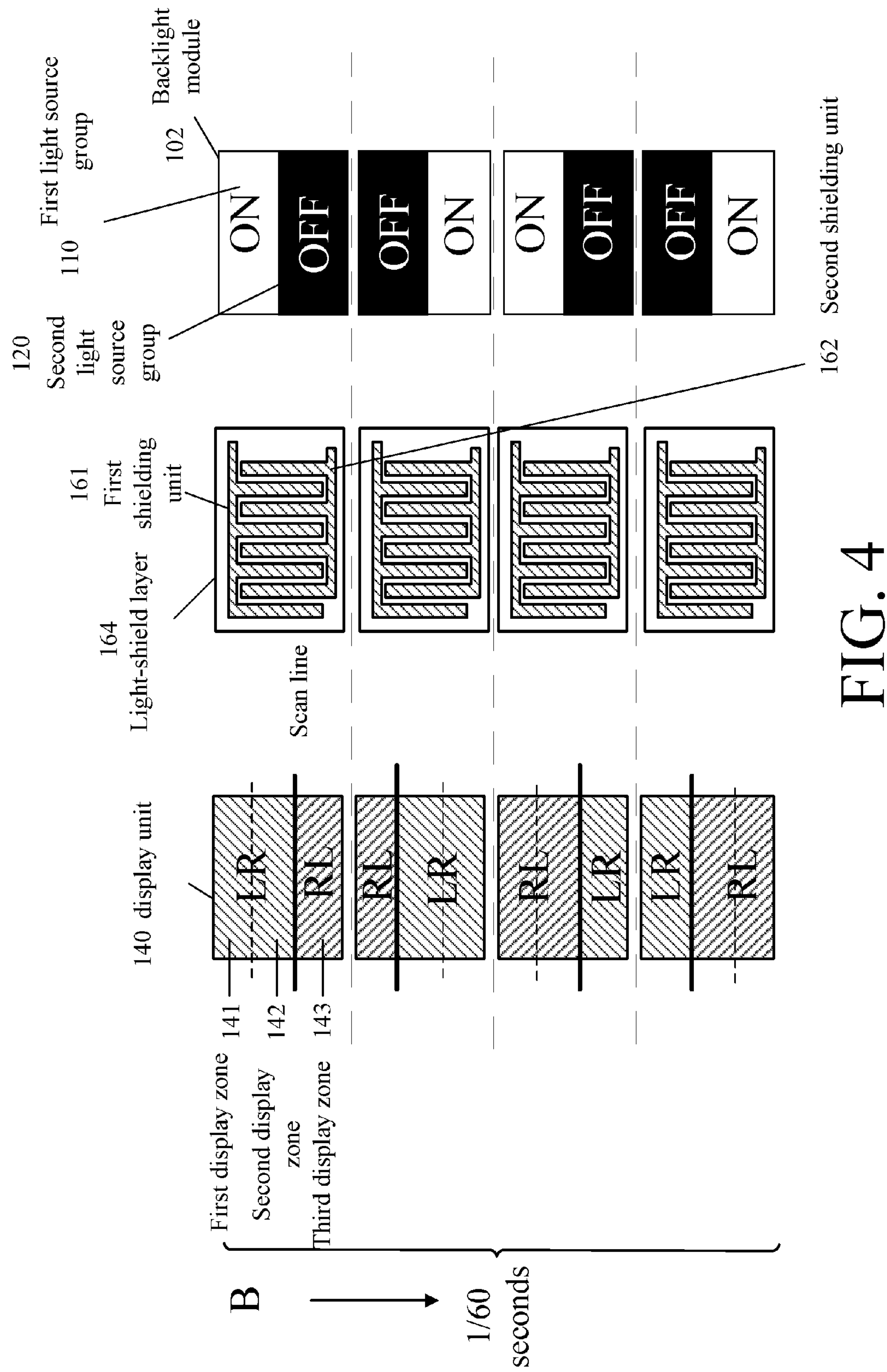
FIG. 4 shows the display unit, the light-shield layer, and the backlight module in motion of the first embodiment of the present invention.

FIG. 4 shows the display unit 140, the light-shield layer 164, and the backlight module 102 in a sequence of the first embodiment of the present invention. The display unit 140 scans along the direction of arrow B in a row-by-row manner until the last row is finished being scanned. The duration of the scan is called a frame rate. Afterwards, the display unit 140 restarts scanning the first row. The embodiment thereinafter is explained based on a frame rate of 120 Hz, however it is noted that the frame rate of the display unit 140 is not limited to 120 Hz. The backlight module 102 comprises a first light source group 110 and a second light source group 120. Preferably, each of the first light source group 110 and the second light source group 120 cover one-half of the light-emitting area of the backlight module 102. The display unit 140 comprises a first display zone 141, a second display zone 142, and a third display zone 143. Preferably, each of the display zones 141, 142, and 143 cover one-third of the display unit 140. Signals that enable pixels of odd columns to display images according to left-eye signals and pixels of even columns to display images according to right-eye signals are defined as first data voltage signals "LR". On the contrary, signals that enable pixels of odd columns to display images according to right-eye signals and pixels of even columns to display images according to left-eye signals are defined as second data voltage signals "RL".

Figure 5:
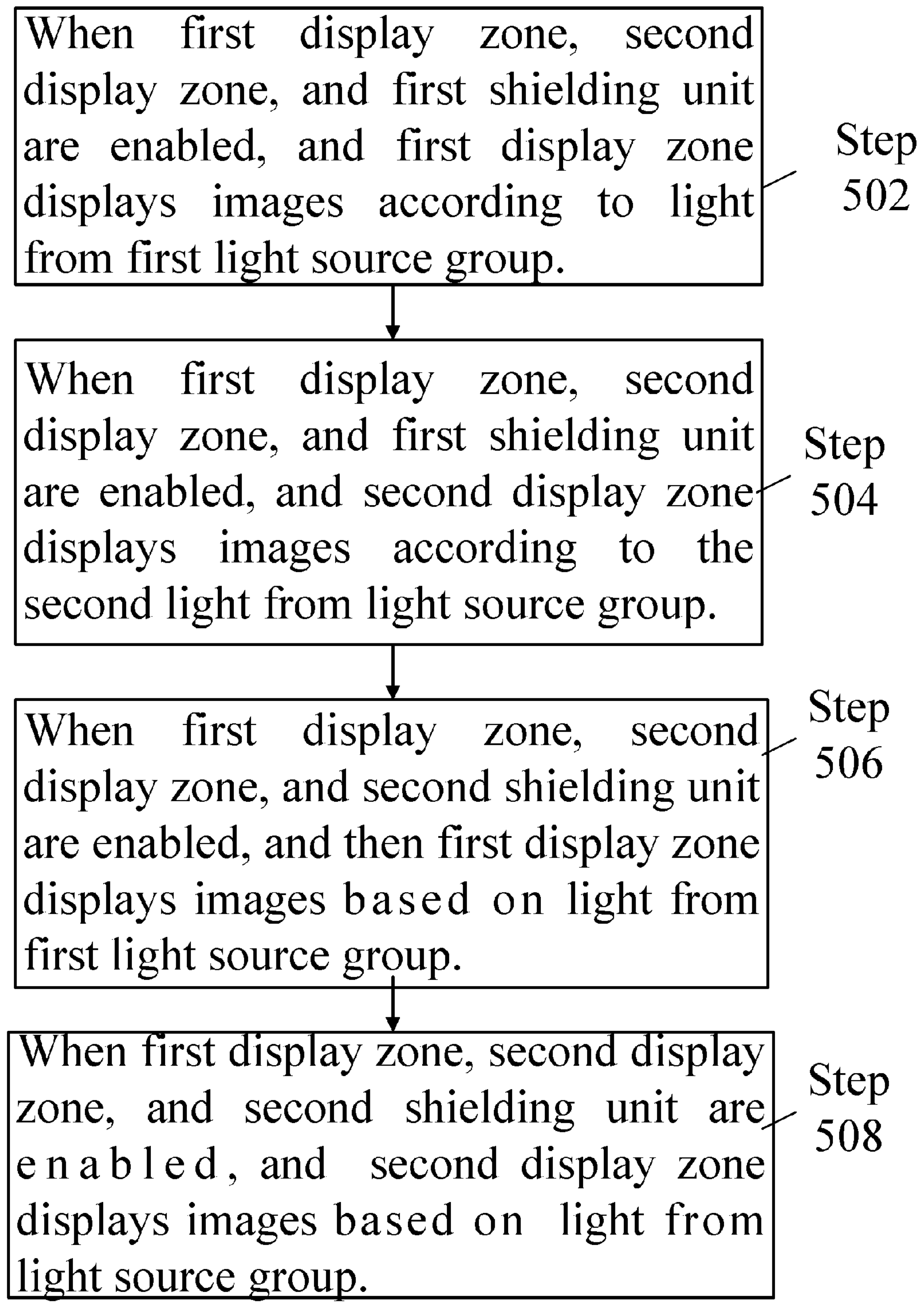
FIG. 5 is a method flowchart of the present invention.

FIG. 5 is a method flowchart of the present invention. As Step 502 shows, firstly, the first and second display zones 141 and 142 receive first data voltage signals LR, and the third display zone 143 maintains the second data voltage signals RL corresponding to the previous frame when the second display zone 142 is being scanned. At this time, the first shielding unit 161 of the barrier 160 is enabled in response to first shielding signals, and the first light source group 110 emits first light in response to first enabling signals. Thus, the first and second display zones 141 and 142 display images according to the first light. Meanwhile, because the second light source group 120 is turned off, the images displayed by the third display zone 143 cannot be seen.

Subsequently, as Step 504 shows, when the first display zone 141 receives the second data voltage signals RL, and the second and third display zones 142 and 143 receive first data voltage signals LR, the first shielding unit 161 is enabled in response to the first shielding signals, and the second light source group 120 produces a second light in response to the second enabling signals. Thus, the second and third display zones 142 and 143 display images according to the second light. Meanwhile, because the first light source group 110 is turned off, the images displayed by the first display zone 141 cannot be seen.

Afterwards, as Step 506 shows, when the first and second display zones 141 and 142 receive second data the voltage signals RL, and the third display zone 143 receives first data voltage signals LR, the second shielding unit 162 is enabled in response to the second shielding signals, and the first light source group 110 produces a first light in response to the first enabling signals. Thus, the first and second display zones 141 and 142 display images according to the first light. Meanwhile, because the second light source group 120 is turned off, the images displayed by the third display zone 143 cannot be seen.

Finally, as Step 508 shows, when the first display zone 141 receives the first data voltage signals LR, and the second and third display zones 142 and 143 receive second data voltage signals RL, the second shielding unit 162 is enabled in response to the second shielding signals, and the second light source group 120 produces a second light in response to the second enabling signals. Thus, the second and third display zones 142 and 143 display images according to the second light. Meanwhile, because the first light source group 110 is turned off, the images displayed by the first display zone 141 cannot be seen.

It is noted that the frequency of the second enabling signals and the first enabling signals equals the scan frequency of the display and the frequency of the first shielding signals, and the second shielding signals equals half of the scan frequency of the display. For example, if the scan frequency of the display is 120 Hz, then that of the first and second shielding signals is 60 Hz and the second and first enabling signals is 120 Hz. The synchronizer 104 synchronously outputs the first and second shielding signals and the second and first enabling signals. In this way, resolution will not decrease and different data voltage signals will not be shown simultaneously in the display unit 140 when an observer views images displayed by the display unit 140.

Figure 6A:
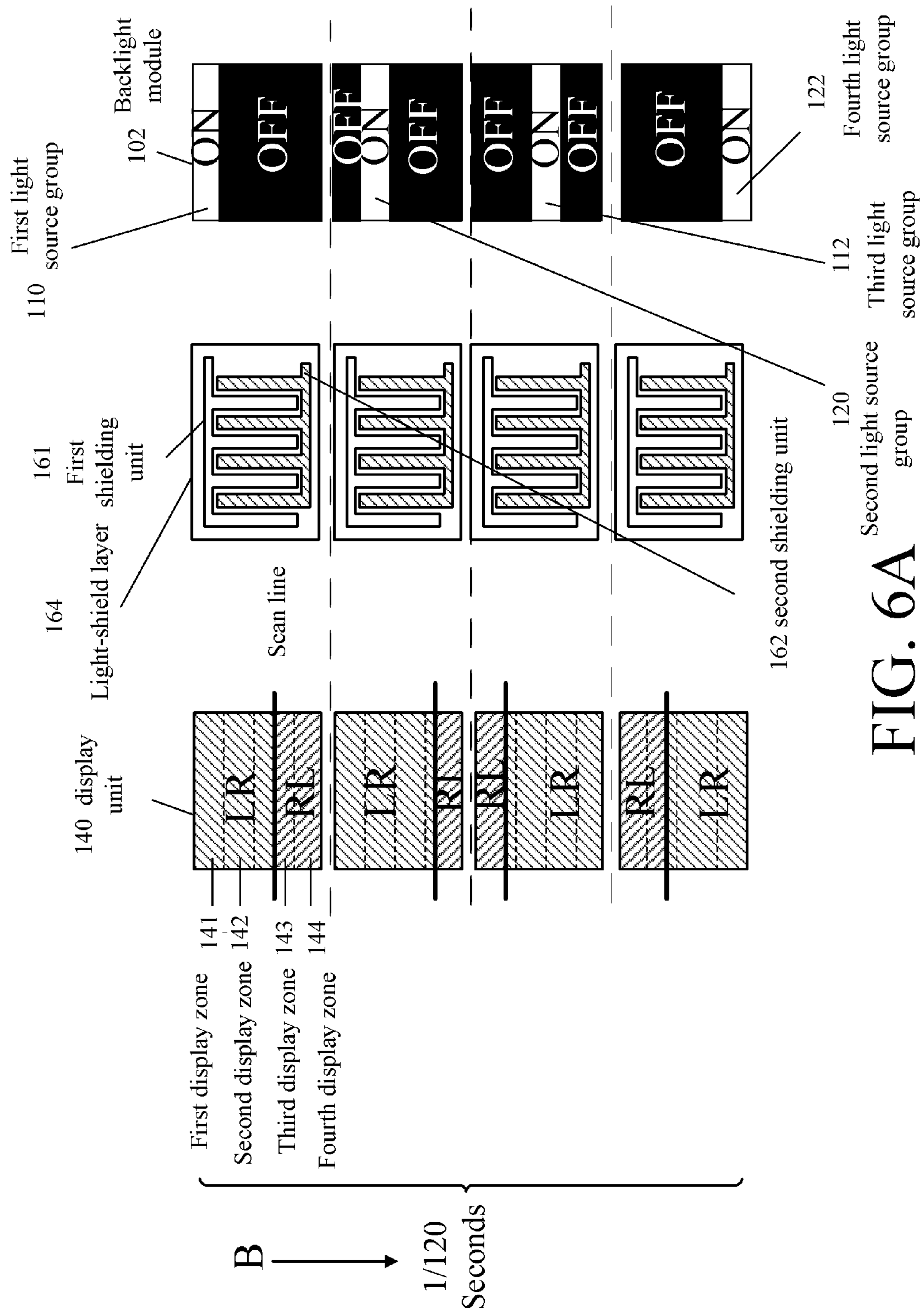
FIGS. 6A and 6B illustrate the display unit, the light-shield layer, and the backlight module in motion of the second embodiment of the present invention.
Figure 6B:
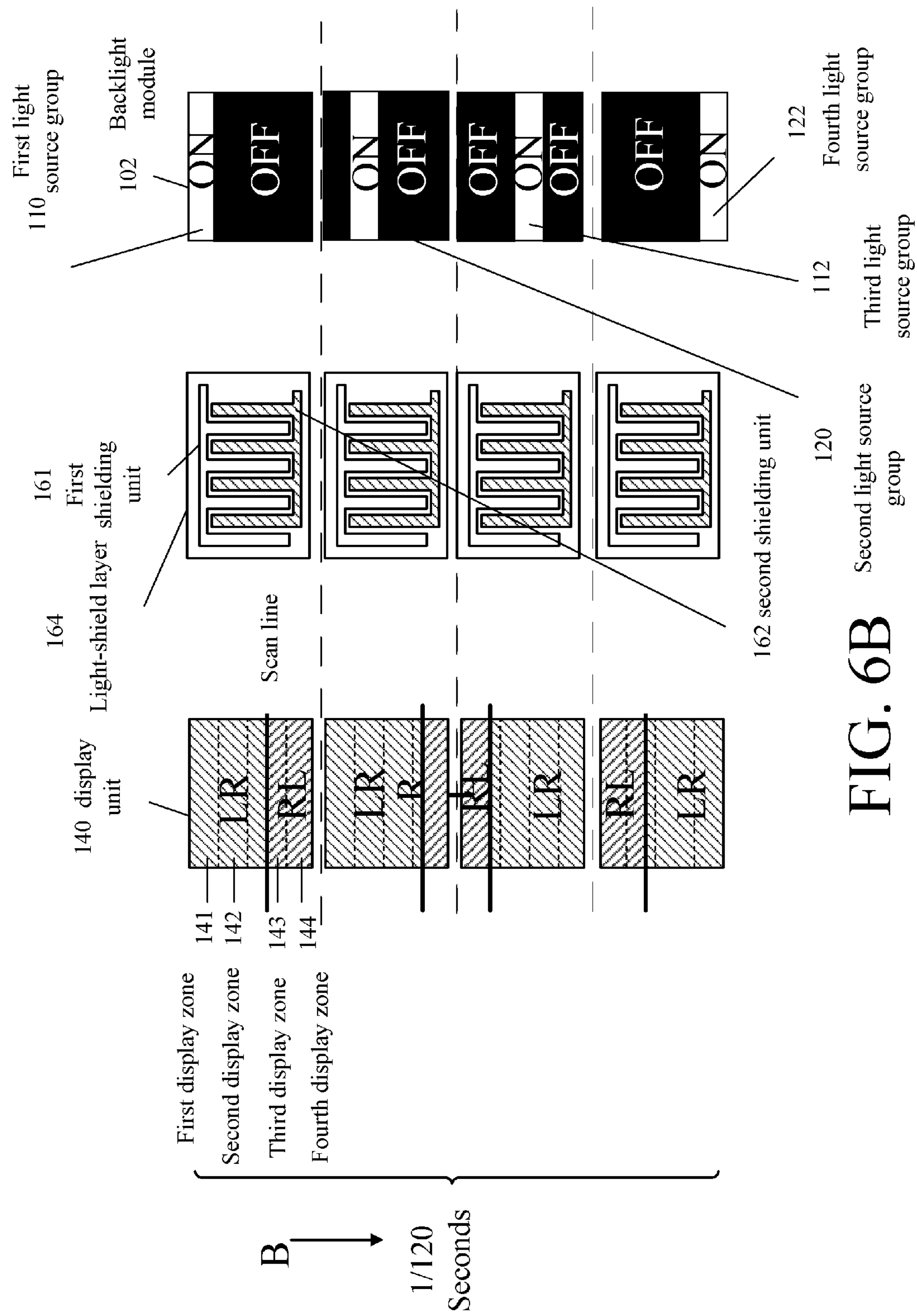

FIGS. 6A and 6B illustrate the display unit 140, the light-shield layer 164, and the backlight module 102 in the sequence of the second embodiment of the present invention. The display unit 140 scans along the direction of arrow B in a row-by-row manner until the last row is finished being scanned. The duration of the scan is called a frame rate. Afterwards, the display unit 140 restarts scanning the first row. The embodiment thereinafter is explained based on a frame rate of 120 Hz, however it is noted that the frame rate of the display unit 140 is not limited to 120 Hz. The backlight module 102 comprises a first light source group 110, a second light source group 120, a third light source group 112, and a fourth light source group 122. Preferably, each of the first light source group 110, the second light source group 120, the third light source group 112, and the fourth light source group 122 covers one-fourth of the light-emitting area of the backlight module 102. The display unit 140 comprises a first display zone 141, a second display zone 142, a third display zone 143, and a fourth display zone 144. Preferably, each display zones 141, 142, 143, and 144 cover one-fourth of the display unit 140. Signals that enable pixels of odd columns to display images according to left-eye signals and pixels of even columns to display images according to right-eye signals are defined as first data voltage signals "LR". On the contrary, signals that enable pixels of odd columns to display images according to right-eye signals and pixels of even columns to display images according to left-eye signals are defined as second data voltage signals "RL".

As FIG. 6A shows, firstly, the first and second display zones 141 and 142 receive the first data voltage signals LR, and the third and fourth display zones 143 and 144, part of which has not been scanned yet, maintain second data voltage signals RL corresponding to the previous frame when the third display zone 143 was scanned. At this time, the first shielding unit 161 of the barrier 160 is enabled (but the second shielding unit 162 is disabled) in response to the first shielding signals, and the first light source group 110 produces first light in response to first enabling signals. Thus, the first display zone 141 displays images according to light of the first light source group 110. Meanwhile, because the light source groups 112, 120, and 122 are turned off, the images displayed by the second, third, and fourth display zones 142, 143, and 144 cannot be seen.

Next, the scanning continues downwards. The first, second, and third display zones 141, 142, and 143 receive first data voltage signals LR, and the fourth display zone 144, part of which has not been scanned, maintains second data voltage signals RL corresponding to the previous frame when the fourth display zone 144 was scanned. At this time, the first shielding unit 161 of the barrier 160 is enabled (but the second shielding unit 162 is disabled) in response to first shielding signals, and the second light source group 120 produces light in response to second enabling signals. Therefore, the second display zone 142 displays images according to light of the second light source group 120. Meanwhile, because the light source groups 112, 120, and 122 are turned off, the images displayed by the first, third, and fourth display zones 141, 143, and 144 cannot be seen.

Subsequently, when the first display zone 141 restarts being scanned, the second, third, and fourth display zones 142, 143, and 144 receive first data voltage signals LR, and the first display zone 141 receives second data voltage signals RL. At this time, the first shielding unit 161 of the barrier 160 is enabled (but the second shielding unit 162 is disabled) in response to first shielding signals, and the third light source group 112 produces light in response to third enabling signals. Therefore, the third display zone 143 displays images according to light of the third light source group 112. Meanwhile, because the light source groups 110, 112, and 122 are turned off, the images displayed by the first, second, and fourth display zones 141, 142, and 144 cannot be seen.

Afterwards, while the second display zone 142 is scanned, the first display zone 141 receives second data voltage signals RL, the third and fourth display zones 143 and 144 receive first data voltage signals LR, and the first display zone 141 receives second data voltage signals RL. At this time, the first shielding unit 161 of the barrier 160 is enabled (but the second shielding unit 162 is disabled) in response to first shielding signals, and the fourth light source group 122 produces light in response to fourth enabling signals. Therefore, the fourth display zone 144 displays images according to light of the fourth light source group 122. Meanwhile, because the light source groups 110, 112, and 122 are turned off, the images displayed by the first, second, and third display zones 141, 142, and 143 cannot be seen.

As shown in FIG. 6B, the first and second display zones 141 and 142 receive the first data voltage signals LR, and the third and fourth display zones 143 and 144, part of which has not been scanned yet, maintain second data voltage signals RL corresponding to the previous frame when the third display zone 143 was scanned. At this time, the second shielding unit 162 of the barrier 160 is enabled (but the first shielding unit 161 is disabled) in response to the second shielding signals, and the first light source group 110 produces second light in response to the first enabling signals. Thus, the first display zone 141 displays images according to light from the first light source group 110. Meanwhile, because the light source groups 112, 120, and 122 are turned off, the images displayed by the second, third, and fourth display zones 142, 143, and 144 cannot be seen.

Next, the scanning continues downwards. The first, second, and third display zones 141, 142, and 143 receive first data voltage signals LR, and the fourth display zone 144, part of which has not been scanned, maintains second data voltage signals RL corresponding to the previous frame when the fourth display zone 144 was scanned. At this time, the second shielding unit 162 of the barrier 160 is enabled (but the first shielding unit 161 is disabled) in response to the second shielding signals, and the second light source group 120 produces light in response to second enabling signals. Therefore, the second display zone 142 displays images according to the light of the second light source group 120. Meanwhile, because the light source groups 112, 120, and 122 are disabled, the images displayed by the first, third, and fourth display zones 141, 143, and 144 cannot be seen.

Subsequently, when the first display zone 141 restarts being scanned, the second, third, and fourth display zones 142, 143, and 144 receive first data voltage signals LR, and the first display zone 141 receives the second data voltage signals RL. At this time, the second shielding unit 162 of the barrier 160 is enabled (but the first shielding unit 161 is disabled) in response to the second shielding signals, and the third light source group 112 produces light in response to third enabling signals. Therefore, the third display zone 143 displays images according to the light from the third light source group 112. Meanwhile, because the light source groups 110, 112, and 122 are disabled, the images displayed by the first, second, and fourth display zones 141, 142, and 144 cannot be seen.

Afterwards, while the second display zone 142 is being scanned, the first display zone 141 receives second data voltage signals RL, the third and fourth display zones 143 and 144 receive first data voltage signals LR, and the first display zone 141 receives second data voltage signals RL. At this time, the second shielding unit 162 of the barrier 160 is enabled (but the first shielding unit 161 is disabled) in response to the second shielding signals, and the fourth light source group 122 produces light in response to fourth enabling signals. Therefore, the fourth display zone 144 displays images according to the light from the fourth light source group 122. Meanwhile, because the light source groups 110, 112, and 122 are disabled, the images displayed by the first, second, and third display zones 141, 142, and 143 cannot be seen.

It is noted that the frequency of the first shielding signals the second shielding signals is equal to half of the scan frequency of the display. For example, if the scan frequency of the display is 120 Hz, then that of the first and second shielding signals is 60 Hz and the frequency of turning on each light source groups is also 120 Hz. Resolution will not decrease and different data voltage signals will not be shown simultaneously in the display unit 140 when an observer views images displayed by the display unit 140. Because the brightness distribution constructed by the backlight module 102 at the boundary of every two light source groups lacks a sharp bright-dark contrast, it is gradual. In this way, crosstalk occurs when a light region of the backlight module 102 is very close to a scanned display zone. The benefit of dividing the display unit 140 and backlight module 102 into four display zones is that the distance between a light region of the backlight module 102 and a scanned display zone increases and crosstalk decreases.

The display of the present invention is one display that can exhibit diverse images simultaneously. For example, it can be utilized in stereoscopic displays that use binocular disparity, or in displays whose observers on the left and right sides of a display frame can view different images, respectively. More specifically, the display of the present invention can be applied to liquid crystal television sets, liquid crystal displays, plasma displays, overhead projectors, notebook computers, personal digital assistances (PDAs), medical displays, GPS automotive displays, and so on.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A stereoscopic display, comprising:

a display unit, comprising a plurality of pixels arranged in a plurality of pixel rows and a plurality of pixels columns comprising:

a first display zone and a second display zone, wherein said display unit updates a first display zone before updating said second display zone;

an odd set of pixel columns; and an even set of pixel columns;

wherein a scan line updates each pixel row in series to alternate between:

an LR frame, displaying an LR mode wherein said odd set of pixel columns display left eye data and said even set of pixel columns display right eye data; and an RL frame, displaying an RL mode wherein said odd set of pixel columns display right eye data and said even set of pixel columns display left eye data;

a light shield, disposed in front of said display unit, comprising:

a first shielding unit, configured to block said even set of pixel columns from a left eye of a viewer and to block said odd set of pixel columns from a right eye of the viewer when said first shielding unit is disabled; and a second shielding unit, configured to block said odd set of pixel columns from said left eye of the viewer and to block said even set of pixel columns from said right eye of the viewer when said second shielding unit is disabled; and a backlight module, disposed behind said display unit, comprising a plurality of mutually exclusive light source groups that illuminate alternatively, each light source group corresponding to a discrete subset of adjacent pixel rows, wherein only the farthest light source group from said scan line illuminates an illuminated set of pixel rows, a top scan line being considered adjacent to a bottom scan line;

wherein said first shielding unit is disabled when said illuminated set of pixel rows display said LR mode and enabled when said illuminated set of pixel rows display said RL mode, and said second shielding unit is disabled when said illuminated set of pixel rows display said RL mode and enabled when said illuminated set of pixel rows display said LR mode, wherein after said first display zone is updated, then a first light source group of said plurality of mutually exclusive light source groups is enabled to illuminate said first display zone, and wherein after said second display zone is updated, then a second light source group of said plurality of mutually exclusive light source groups is enabled to illuminate said second display zone.

2. The stereoscopic display of claim 1, wherein said plurality of light source groups consists of:

the first light source group, corresponding to the upper half of said pixel rows, wherein said first light source group is not illuminated when said scan line updates said upper half of said pixel rows; and the second light source group, corresponding to the lower half of said pixel rows, wherein said second light source group is not illuminated when said scan line updates said lower half of said pixel rows.

3. The stereoscopic display of claim 1, wherein said plurality of light source groups consists of:

the first light source group, corresponding to the upper quarter of said pixel rows;

the second light source group, corresponding to a second quarter of said pixel rows immediately below said upper fourth of said pixel rows;

a third light source group, corresponding to a third quarter of said pixel rows immediately above the bottom fourth of said pixel rows; and a fourth light source group, corresponding to said bottom quarter of said pixel rows, and said first light source group is illuminated when said scan line updates said third quarter of said pixel rows, said second light source group is illuminated when said scan line updates said bottom quarter of said pixel rows, said third light source group is illuminated when said scan line updates said upper quarter of said pixel rows, and said fourth light source group is illuminated when said scan line updates said second quarter of said pixel rows.

4. The stereoscopic display of claim 1, wherein said display unit is updated alternatively with a first voltage data and a second voltage data.

5. The stereoscopic display of claim 4, wherein said first shielding unit shields said first voltage data; and said second shielding unit shields said second voltage data.

6. The stereoscopic display of claim 4, wherein said first voltage data represents said LR frame, and said second voltage data represents said RL frame.

7. The stereoscopic display of claim 1 further comprising:

a first polarization plate, transmitting light with a first polarizing direction; and a second polarization plate, transmitting light with a second polarizing direction that is different from the first polarizing direction.

8. The stereoscopic display of claim 7, wherein said first polarizing direction is perpendicular to said second polarizing direction.

9. The stereoscopic display of claim 7 further comprising:

a third polarization plate, transmitting light with a third polarizing direction different from said second polarizing direction; and a barrier, disposed between said second polarization plate and said third polarization plate.

10. The stereoscopic display of claim 9, wherein said second polarizing direction is perpendicular to said third polarizing direction.

11. A method of driving a stereoscopic display, comprising:

providing a stereoscopic display, comprising:

a display unit, comprising a plurality of pixels arranged in a plurality of pixel rows and a plurality of pixels columns comprising:

a first display zone and a second display zone;

an odd set of pixel columns; and an even set of pixel columns;

a light shield, comprising:
a first shielding unit; and
a second shielding unit;
a backlight module, comprising a plurality of mutually exclusive light source groups that illuminate alternatively, each light source group corresponding to a discrete subset of adjacent pixel rows;
an LR mode updating step, comprising:
disabling said first shielding unit to block said odd set of pixel columns from a right eye of a viewer and to block said even set of pixel columns from a left eye of the viewer; and
updating each pixel row in series by a scan line to display an LR mode wherein said odd set of pixel columns display left eye data and said even set of pixel columns display right eye data; and
an RL mode updating step, comprising:
disabling said second shielding unit to block said odd set of pixel columns from said left eye and to block said even set of pixel columns from said right eye; and
updating each pixel row in series by said scan line to display an RL mode wherein said odd set of pixel columns display right eye data and said even set of pixel columns display left eye data,
wherein said LR mode updating step and said RL mode updating step alternate, and only the light source group of said plurality of light source groups corresponding to the discrete subset of adjacent pixel rows that is farthest from said scan line illuminates, a top scan line is being considered adjacent to a bottom scan line.

12. The method of claim 11, wherein said plurality of light source groups consists of:
a first light source group, corresponding to the upper half of said pixel rows, wherein said first light source group is not illuminated when said scan line updates said upper half of said pixel rows; and
a second light source group, corresponding to the lower half of said pixel rows, wherein said second light source group is not illuminated when said scan line updates said lower half of said pixel rows.

13. The method of claim 11, wherein said plurality of light source groups consists of:
a first light source group, corresponding to the upper quarter of said pixel rows;
a second light source group, corresponding to a second quarter of said pixel rows immediately below said upper fourth of said pixel rows;
a third light source group, corresponding to a third quarter of said pixel rows immediately above the bottom fourth of said pixel rows; and
a fourth light source group, corresponding to said bottom quarter of said pixel rows, and
said first light source group is illuminated when said scan line updates said third quarter of said pixel rows, said second light source group is illuminated when said scan line updates said bottom quarter of said pixel rows, said third light source group is illuminated when said scan line updates said upper quarter of said pixel rows, and said fourth light source group is illuminated when said scan line updates said second quarter of said pixel rows.

14. The method of claim 11, further comprising alternatively updating said display unit with a first voltage data and a second voltage data.

15. The method of claim 14, further comprising:
shielding said first voltage data with said first shielding unit; and
shielding said second voltage data with said second shielding unit.

16. The stereoscopic display of claim 14, wherein said first voltage data represents a first frame displaying said LR mode, and said second voltage data represents a second frame displaying said RL mode.

17. The method of claim 11 further comprising:
providing a first polarization plate and a second polarization plate;
transmitting light through the first polarization plate with a first polarizing direction; and
transmitting light through the second polarization plate with a second polarizing direction that is different from the first polarizing direction.

18. The method of claim 17, wherein said first polarizing direction is perpendicular to said second polarizing direction.

19. The method of claim 17 further comprising:
providing a third polarization plate;
providing a barrier, disposed between said second polarization plate and said third polarization plate; and
transmitting light through the third polarization plate with a third polarizing direction that is different from said second polarizing direction.

20. The method of claim 19, wherein said second polarizing direction is perpendicular to said third polarizing direction.

* * * * *